J. E. RYAN.
HAND GRIP FOR STEERING WHEELS.
APPLICATION FILED MAY 20, 1918.
1,317,730.  Patented Oct. 7, 1919.
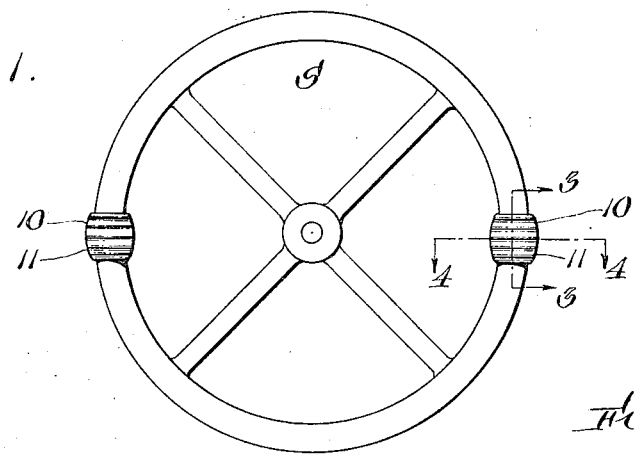
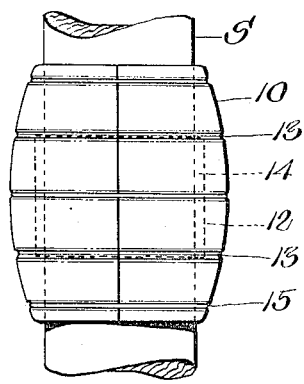
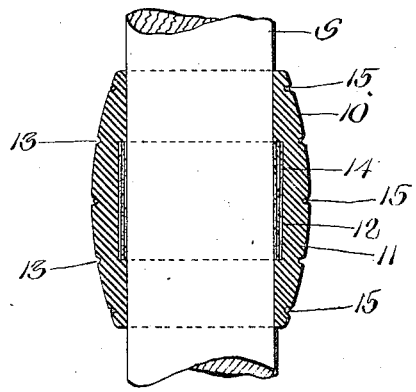
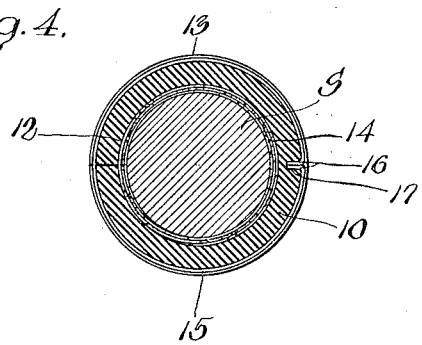
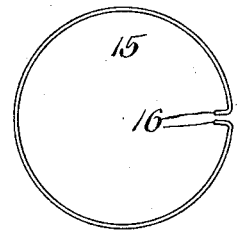
Inventor:
John E. Ryan,
by L. B. Weymouth,
Attorney.

UNITED STATES PATENT OFFICE.

JOHN E. RYAN, OF BOSTON, MASSACHUSETTS.

HAND-GRIP FOR STEERING-WHEELS.

1,317,730.    Specification of Letters Patent.    Patented Oct. 7, 1919.

Application filed May 20, 1918. Serial No. 235,467.

*To all whom it may concern:*

Be it known that I, JOHN E. RYAN, a citizen of the United States, residing at Boston, in the county of Suffolk and State of Massachusetts, have invented certain new and useful Improvements in Hand-Grips for Steering-Wheels, of which the following is a specification.

This invention has reference particularly to improvements in handgrips for steering wheels of automobiles or the like.

Drivers of automobiles have found it difficult during a long drive to maintain a firm grip upon the usual smooth rim of a steering wheel. This difficulty is especially noticeable in warm weather when the hands of the driver perspire, as well as in cold weather when the hands of the driver become more or less numb with the cold. With this in view, numerous attempts have been made to provide handgrips that would be more convenient to grasp than the bare rim of a steering wheel. The handgrips heretofore devised for this purpose, however, have met with but little or no commercial success, mainly for the reasons that they are either likely to slip longitudinally on the rim of the steering wheel; or are unsightly and cumbersome; or else cannot be attached and detached without permanently defacing the steering wheel.

The primary objects of the present invention are to produce handgrips for steering wheels which, although extremely simple, neat, and durable in construction and of suitable shape and size to comfortably fit the palms of the driver's hands, are adapted to be rigidly and securely anchored in convenient relative positions on the rim of a steering wheel without thereby defacing or otherwise injuring said rim.

Other objects of the invention will appear from the following description.

The invention consists in the means for securing a handgrip to a steering wheel.

The invention further consists in such other novel features of construction and combination of parts as shall hereinafter be described and pointed out in the claims.

Figure 1, represents a plan view of a steering wheel with a pair of handgrips embodying my invention applied thereto.

Fig. 2, represents an enlarged side elevation of one of the handgrips and a portion of the rim of a steering wheel.

Figs. 3 and 4, represent enlarged sectional views taken on the line 3—3 and 4—4 of Fig. 1.

Fig. 5, represents a detail plan view of a binding ring.

Like characters of reference designate corresponding parts throughout.

In Fig. 1 of the drawings, the steering wheel is shown at S and handgrips at 10, 10 which are shown as being oppositely disposed on the rim of said steering wheel. Each handgrip has a split sleeve 11 of rubber or other suitable material, which sleeve is provided with the annular recess 12 centrally positioned on its inner surface and the series of narrow annular grooves 13 on its outer surface.

To attach a handgrip to the steering wheel, a sleeve or band 14 is formed on the wheel in the position desired to place the grip; said band 14 being formed by tightly winding adhesive tape about the rim. The split sleeve 11 is then placed on the rim with the annular recess 12 thereof closely fitting over band 14. Said split sleeve is bound or closed about the rim by the annular binding wires 15 which fit into the grooves 13 in said sleeve and are provided with the inwardly bent ends 16, which ends are inserted into recesses 17 in said sleeve. In the drawings three wires are shown on the sleeve; one in the center and one at each end.

It will be seen that when the handgrips are thus attached to the steering wheel that as the binding wires 15 closely grip the split sleeve about the rim, the engagement of the ends of the bands 14 with the ends of the recesses 12 will effectively prevent the handgrips from slipping longitudinally on the steering wheel. Also the adhesive tape forming the bands not only firmly adheres to the rim of the steering wheel but also adheres to the split sleeves of the hand grips.

The handgrips are preferably but two inches long and are so shaped that they comfortably fit the operator's hands. The grooves 13 as well as the shape of the handgrips tend to prevent the operator's hands from slipping on the handgrips.

It will be seen that the handgrips may be very easily attached or detached from the steering wheel without marring its appearance.

Having described a preferred embodiment of my invention I claim as new and desire to secure by Letters Patent:—

1. The combination with a steering wheel of a band of adhesive tape on the rim of said steering wheel, a handgrip having a split sleeve of resilient material on said rim and provided with an internal annular groove encompassing said band of tape, and means for binding said split sleeve about said rim.

2. The combination with a steering wheel of a band secured to the rim of the wheel, and a hand grip comprising a sleeve having an internal groove encompassing said band whereby the hand grip is held from lengthwise movement on the rim of the wheel.

3. The combination with a steering wheel of a band made of layers of adhesive tape on the rim of said steering wheel, a split sleeve of resilient material encompassing said band, and means for binding said sleeve about said rim.

4. The combination with a steering wheel of a band secured by adhesion to the rim of said steering wheel, a handgrip having a sleeve encompassing and secured to said band, and wires encompassing said sleeve for binding said sleeve about said rim.

5. The combination with a steering wheel of a band of adhesive tape on the rim of said steering wheel, a handgrip having a split sleeve of resilient material which encompasses said band of tape, and wires inserted in annular grooves in said sleeve for binding said sleeve about said rim.

In testimony whereof I have affixed my signature.

JOHN E. RYAN.

Copies of this patent may be obtained for five cents each, by addressing the "Commissioner of Patents, Washington, D. C."